United States Patent
Nakada et al.

(10) Patent No.: US 12,515,555 B2
(45) Date of Patent: Jan. 6, 2026

(54) INFORMATION PROCESSING APPARATUS AND INFORMATION PROCESSING METHOD

(71) Applicant: HONDA MOTOR CO., LTD., Tokyo (JP)

(72) Inventors: Yasuhiro Nakada, Wako (JP); Wataru Matsuyama, Wako (JP); Go Fujikawa, Wako (JP); Toru Yuki, Wako (JP); Norio Kaneko, Wako (JP); Keiichi Arai, Wako (JP); Takayuki Enomoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 699 days.

(21) Appl. No.: 17/898,145

(22) Filed: Aug. 29, 2022

(65) Prior Publication Data

US 2022/0410759 A1    Dec. 29, 2022

Related U.S. Application Data

(63) Continuation of application No. PCT/JP2020/013048, filed on Mar. 24, 2020.

(51) Int. Cl.
*H02J 7/00* (2006.01)
*B60L 58/10* (2019.01)
(Continued)

(52) U.S. Cl.
CPC ............ *B60L 58/10* (2019.02); *G06Q 10/101* (2013.01); *G06Q 30/06* (2013.01);
(Continued)

(58) Field of Classification Search
CPC ...... B60L 58/10; G06Q 10/101; G06Q 30/06; G06Q 30/0645; G06Q 50/10; G07C 5/006
(Continued)

(56) References Cited

U.S. PATENT DOCUMENTS 7,710,073 B2    5/2010    Yamauchi et al.
8,299,757 B2    10/2012   Yamauchi et al.
(Continued)

FOREIGN PATENT DOCUMENTS

JP    2003-288539 A    10/2003
JP    2011-146389 A    7/2011
(Continued)

OTHER PUBLICATIONS

International Search and Written Opinion for PCT/JP2020/013048 mailed Aug. 11, 2020. (partially translated).

*Primary Examiner* — Zixuan Zhou
(74) *Attorney, Agent, or Firm* — Thomas| Horstemeyer, LLP (57) ABSTRACT

An information processing apparatus that processes information related to a rental of a battery, includes: a first acquisition unit configured to acquire performance degradation information before the rental of the battery; a second acquisition unit configured to acquire performance degradation information after the rental of the battery; and a decision unit configured to decide a treatment for a rental user of the battery, based on the performance degradation information that is acquired by the first acquisition unit and the performance degradation information that is acquired by the second acquisition unit.

15 Claims, 10 Drawing Sheets

(51) Int. Cl.
 *G06Q 10/101* (2023.01)
 *G06Q 30/06* (2023.01)
 *G06Q 30/0645* (2023.01)
 *G06Q 50/10* (2012.01)
 *G07C 5/00* (2006.01)

(52) U.S. Cl.
 CPC ......... *G06Q 30/0645* (2013.01); *G06Q 50/10* (2013.01); *G07C 5/006* (2013.01)

(58) Field of Classification Search
 USPC .......................................................... 320/134
 See application file for complete search history.

(56) References Cited

U.S. PATENT DOCUMENTS

| | | |
|---|---|---|
| 9,397,374 B2 | 7/2016 | Yamauchi et al. |
| 2007/0108946 A1 | 5/2007 | Yamauchi et al. |
| 2010/0188039 A1 | 7/2010 | Yamauchi et al. |
| 2013/0018610 A1 | 1/2013 | Yamauchi et al. |
| 2017/0263984 A1 * | 9/2017 | Fujita ................... G01R 31/392 |
| 2020/0326382 A1 | 10/2020 | Matsumara et al. |

FOREIGN PATENT DOCUMENTS

| | | | |
|---|---|---|---|
| JP | 2013-034322 A | 2/2013 | |
| JP | 2013-084199 A | 5/2013 | |
| JP | 2017-166874 A | 9/2017 | |
| WO | WO-2019131825 A1 * | 7/2019 | .............. B60L 58/16 |
| WO | 2021/192045 A1 | 9/2021 | |

\* cited by examiner

INFORMATION PROCESSING APPARATUS AND INFORMATION PROCESSING METHOD

CROSS-REFERENCE TO RELATED APPLICATION(S)

This application is a Continuation of International Patent Application No. PCT/JP2020/013048, filed Mar. 24, 2020, the entire disclosures of which is incorporated herein by reference.

BACKGROUND OF THE INVENTION

Field of the Invention

The present invention relates to an information processing technology related to a battery rental.

Description of the Related Art

In light of considering environments and workers, electric operations of work machines and the like are progressing. With increasing demand for batteries that are the energy sources, particularly in the work machine industry, the periods of time while the batteries are needed are limited in many cases. For example, in a case of lawn mowers, the demand for batteries increases in the season while the lawn is growing. In a case of snow blowers, the demand for batteries increases in the snowfall season. In such situations, it is more convenient for the workers to rent a battery only for when they need one instead of owning a battery.

On the other hand, in a rental business, there are drawbacks such as damage due to improper use and late return of rental items. Rental agencies of batteries have a high interest in appropriate use and billing for the batteries that are their assets. In addition, rental users desire billing that matches rental conditions.

Japanese Patent Laid-Open No. 2003-288539 discloses, in a rental pack business, billing based on the number of times a battery is charged and discharged, sending of a warning based on the temperature of a battery, and the like.

The influence of the number of time a battery is charged and discharged differs depending on the individual battery or the environment. In a case where a "treatment" such as a billing treatment is uniformly decided in accordance with the number of times a battery is charged and discharged times, rental users who use the batteries carefully will be less understanding of (have a feeling of understanding about) such a treatment, in some cases.

SUMMARY OF THE INVENTION

The present invention has an object to improve rental users' feeling of understanding about treatment decisions for the rental users.

According to an aspect of the present invention, there is provided an information processing apparatus that processes information related to a rental of a battery, comprising:
a first acquisition unit configured to acquire performance degradation information before the rental of the battery;
a second acquisition unit configured to acquire performance degradation information after the rental of the battery; and
a decision unit configured to decide a treatment for a rental user of the battery, based on the performance degradation information that is acquired by the first acquisition unit and the performance degradation information that is acquired by the second acquisition unit.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 1:
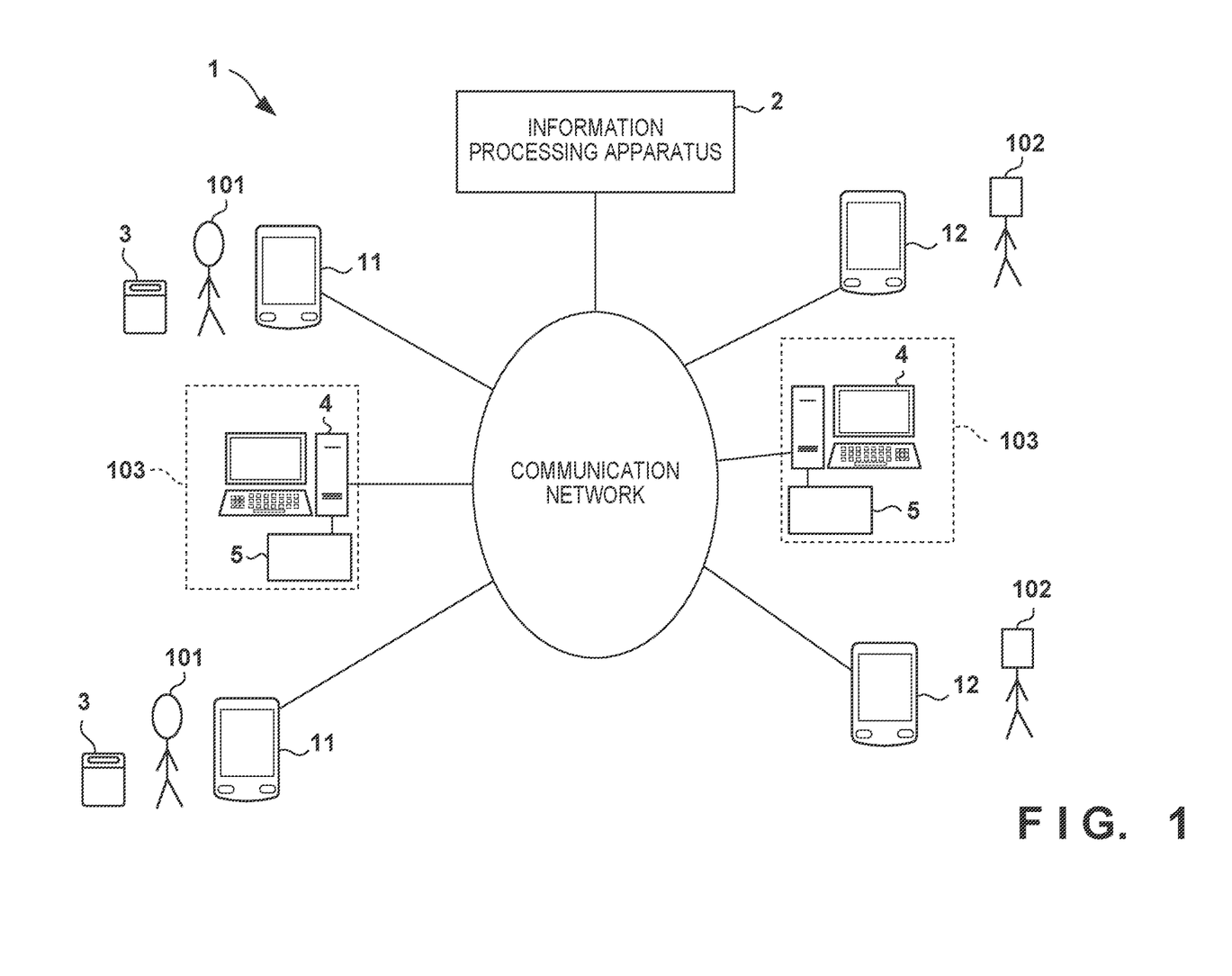
FIG. 1 is a schematic diagram of an assistance system.

<Outline of System>
FIG. 1 is a schematic diagram of an assistance system 1. The assistance system 1 is an assistance system, by an information processing apparatus 2, for a rental service for renting portable batteries 3. The batteries 3 are each, for example, a lithium ion battery. The information processing apparatus 2 is a server to be communicably connected with communication terminals 4, 11, and 12 through a communication network such as the Internet, and to operate a service.

The communication terminal 11 is an example of a communication terminal used by a rental agency (owner) 101, who desires to rent out the batteries 3. The rental agency 101 is an individual or an organization, and the battery 3 is, for example, a used battery. The communication terminal 12 is an example of a communication terminal used by a rental user 102, who desires to rent the battery 3. The communication terminals 11 and 12 are mobile terminals such as smartphones.

The communication terminal 4 is a terminal installed in a service station 103. The service station 103 is a base place for inspecting and delivering the batteries 3, and is assumed to be arranged in a plurality of areas. The communication terminal 4 is, for example, a personal computer. A measurement device 5 is connected with the communication terminal 4. The measurement device 5 is a device for measuring a performance degradation degree of the battery 3. The index of the performance degradation degree is not particularly limited, but is, for example, SOH (full charge capacity at the time of degradation/initial full charge capacity), and the measurement device 5 includes, for example, an electric current sensor and a voltage sensor for measuring a charge or discharge amount of the battery 3. The initial full charge capacity of the battery 3 may be an official value of its manufacturer.

An operation example of the service will be described. The information processing apparatus 2 provides, on the communication network, for example, rental information of the battery 3 that has been registered by the rental agency 101 via the communication terminal 11. The rental information can include information of the specifications of the battery 3 and rental conditions (fee, period, type of electric appliance for which the battery can be used, and the like). The rental user 102 refers to the rental information via the communication terminal 12, and applies for a rental of the battery 3 via the information processing apparatus 2. The rental agency 101 approves an application, and thus the battery 3 is to be rented out from the rental agency 101 to the rental user 102.

Figure 2:
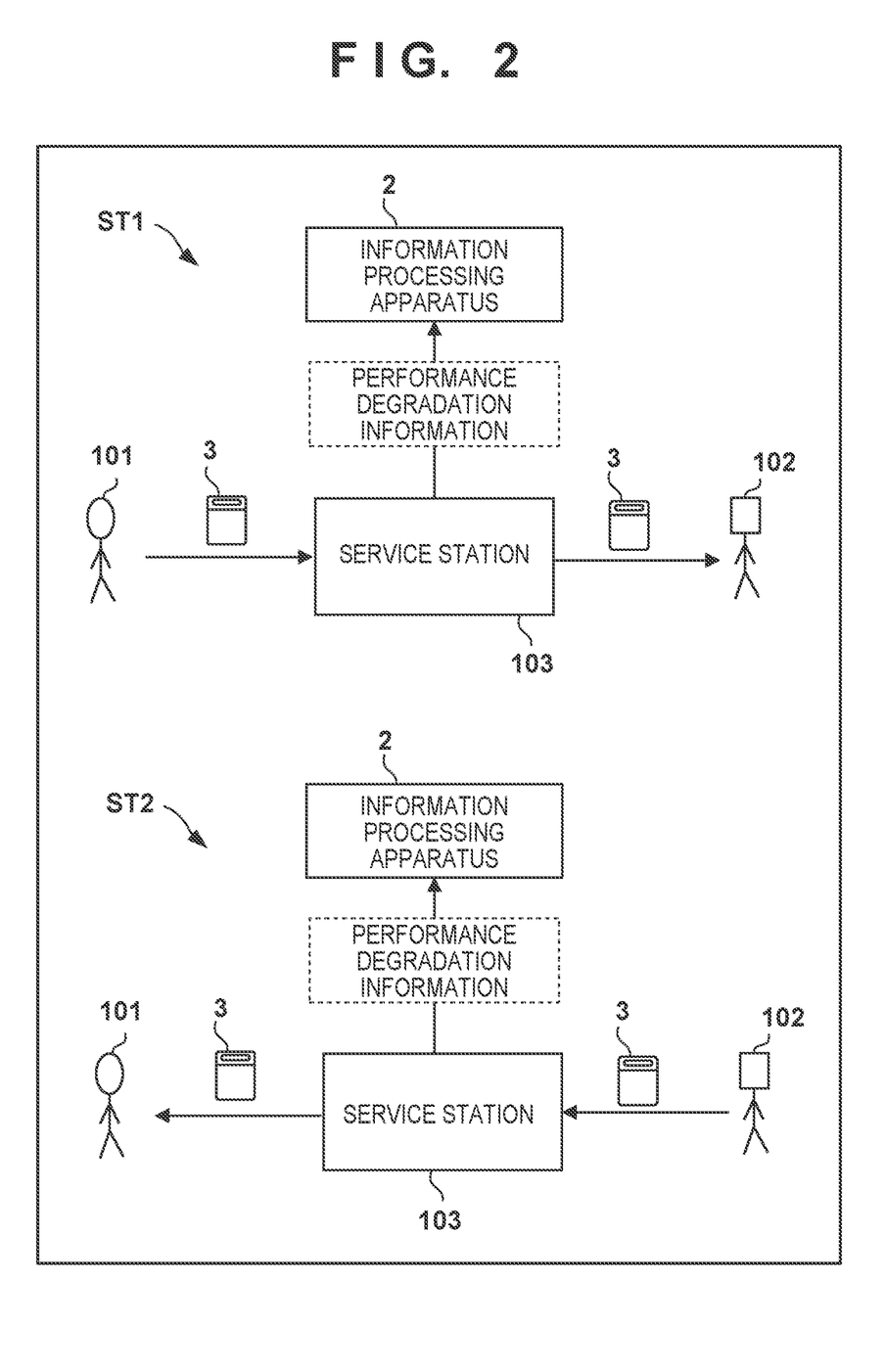
FIG. 2 is an explanatory diagram illustrating an operation example of a service.

A state ST1 of FIG. 2 schematically illustrates an operation at the time of renting out the battery 3. The battery 3 of the rental agency 101 is brought to the service station 103. In the service station 103, the performance degradation degree of the battery 3 is measured by the measurement device 5. Performance degradation information that is its measurement result is transmitted to the information processing apparatus 2 from the communication terminal 4. The service station 103 delivers the battery 3 to the rental user 102. Note that the battery 3 may be rented out together with a battery charger. The rental user 102 attaches the battery 3 to an electric device for use. As the electric device, for example, a work machine, an electric vehicle, and a home appliance can be included. As the work machine, a work machine with highly seasonal characteristics, such as a lawn mower and a snow blower, can also be included. In a case where the battery 3 is used for such a work machine, a rental period of the battery 3 is, for example, several months in some cases, and the way in which the battery is used during such a period can affect the degradation of the performance of the battery 3.

A state ST2 in FIG. 2 schematically illustrates an operation when the battery 3 is returned. The rental user 102 delivers the battery 3 to be returned to the service station 103. In the service station 103, the performance degradation degree of the battery 3 is measured by the measurement device 5. Performance degradation information that is its measurement result is transmitted to the information processing apparatus 2 from the communication terminal 4. The service station 103 delivers the battery 3 to the rental agency 101.

According to the above scheme, the information processing apparatus 2 is capable of acquiring performance degradation information before the rental of the battery 3 and performance degradation information after the rental of the battery 3, particularly at the time of return.

<Information Processing Apparatus>

Figure 3:
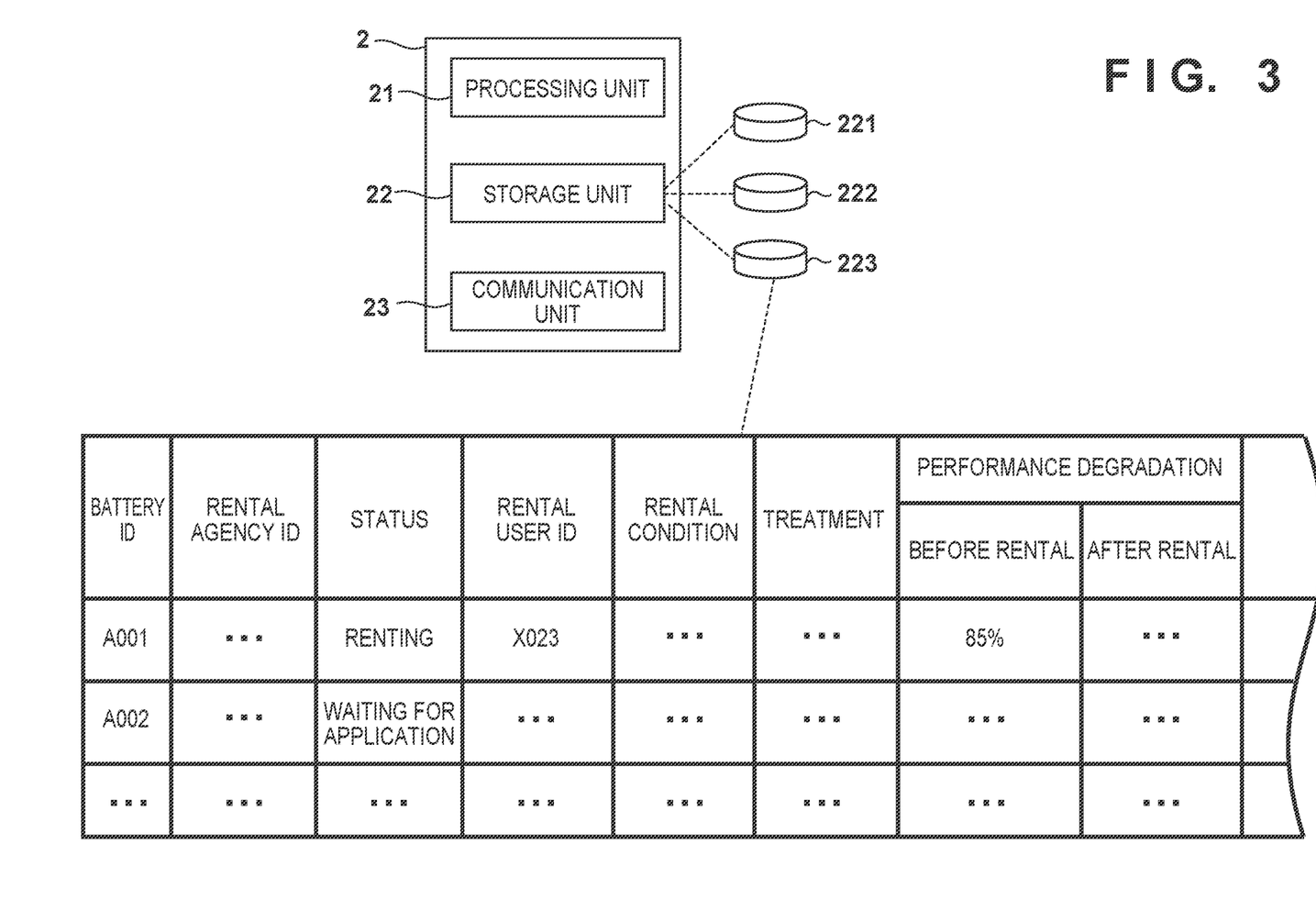
FIG. 3 is a diagram illustrating an example of a block diagram of an information processing apparatus and information stored in a database.

FIG. 3 is a block diagram of the information processing apparatus 2 and a diagram illustrating an example of information stored in a database 223. The information processing apparatus 2 includes a processing unit 21, a storage unit 22, and a communication unit 23. The processing unit 21 is a processor represented by a CPU, and executes a program stored in the storage unit 22. The storage unit 22 is a storage device such as a RAM, a ROM, and a hard disk. The communication unit 23 includes a wired or wireless communication interface capable of communicating with the communication terminals 4, 11, and 12 through the communication network.

The storage unit 22 stores various types of data, in addition to the program executed by the processing unit 21. In an example of FIG. 3, as data to be stored in the storage unit 22, databases (DBs) 221 to 223 are given as examples. The DB 221 is a DB in which information of the rental agency 101 is registered. In the DB 221, an ID, contact details, information of possessed batteries, transaction results, and the like of the rental agency 101 are accumulated. The DB 222 is a DB in which information of the rental user 102 is registered. In the DB 222, an ID, contact details, transaction results, and the like of the rental user 102 are accumulated.

The DB 223 is a DB in which information of the batteries 3 is registered. A record for every battery 3 is accumulated in the DB 223. "Battery ID" is a code for identifying an individual battery, and is, for example, a serial number of the battery 3. "Rental agency ID" is a code for identifying the rental agency 101 of the battery 3. "Status" is information indicating the current situation of the battery 3 (whether the battery 3 is being rented, or the like). "Rental user ID" is information accumulated while the battery 3 is being rented, and is a code for identifying the rental user 102. "Treatment" is information of a treatment for the rental user 102 of the battery 3, and is, for example, information of billing or the like. Details will be described later. "Performance degradation" denotes the performance degradation information before the rental of the battery 3 and the performance degradation information after the rental of the battery 3, particularly at the time of return, both of which have been measured in the service station 103. In the present embodiment, the above "treatment" is decided, based on the information of the "performance degradation". In addition to this, information of the specifications of the batteries 3, information of the rental conditions, and the like can be accumulated in the DB 223.

PROCESS EXAMPLE

Figure 4:
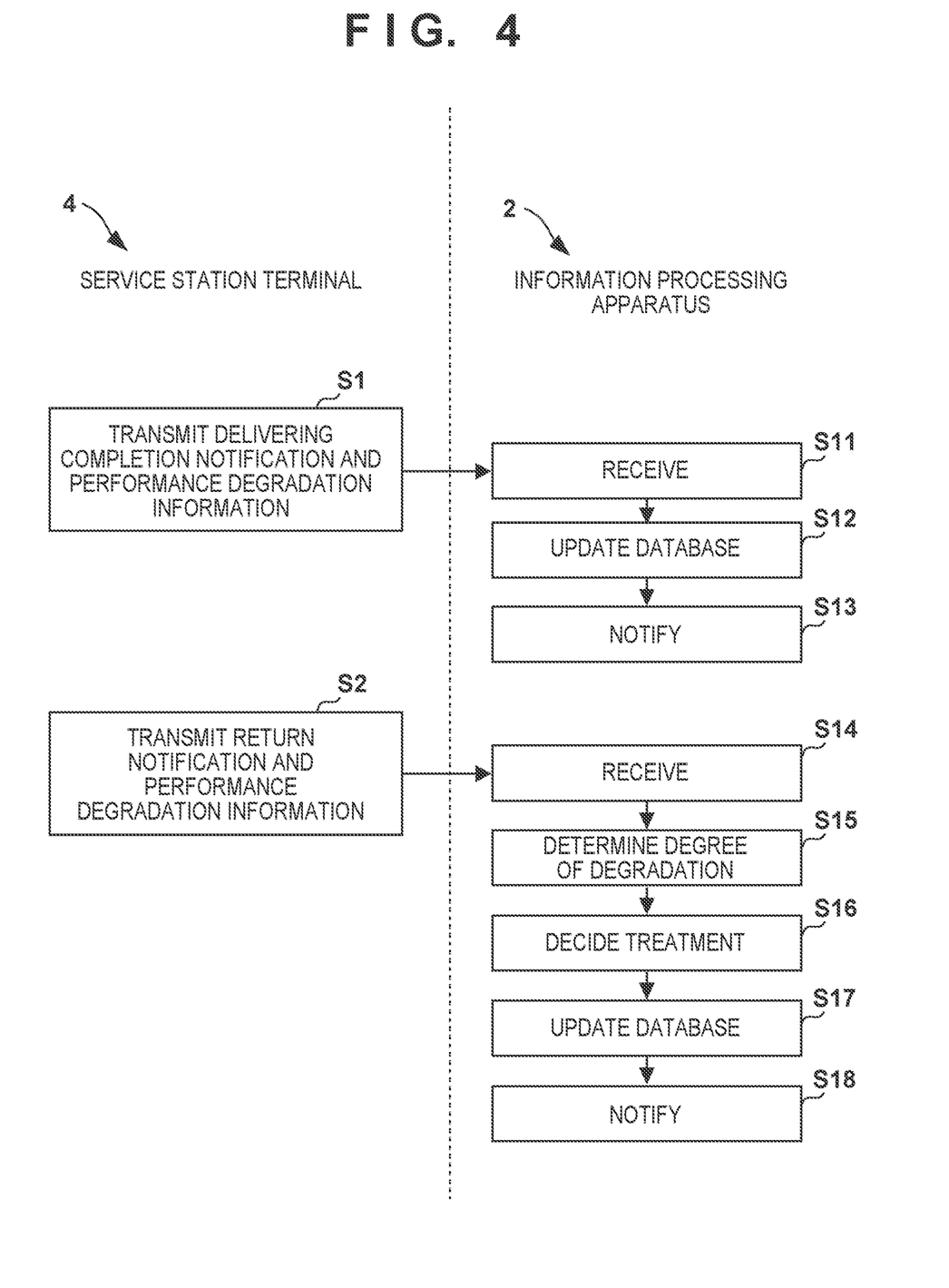
FIG. 4 is a flowchart illustrating an example of a process performed by the assistance system of FIG. 1.

A process example of the system when the battery 3 is rented out and when the battery 3 is returned will be described. FIG. 4 is a flowchart of the process example. When the battery 3 is rented out (the scene of ST1 in FIG. 2), the delivery of the battery 3 to the rental user 102 is completed, and then a delivery completion notification and performance degradation information before the rental are transmitted from the communication terminal 4 of the service station 103 (S1). The information processing apparatus 2 receives the information from the communication terminal 4, and thus acquires the performance degradation information before the rental (S11). In 512, the information processing apparatus 2 updates the DB 223, based on the information received in S11. For example, the "status" and the information of the "performance degradation" "before rental" in the record of the battery 3 are updated. In S13, a notification is transmitted to the communication terminal 11 of the rental agency 101 and the communication terminal 12 of the rental user 102. The notification includes the rental of the battery 3 having started and the performance degradation information before the rental.

At the time of return (the scene of ST2 in FIG. 2), the battery 3 is returned from the rental user 102 to the service station 103, and then a return notification and the performance degradation information after the rental (at the time of return) are transmitted from the communication terminal 4 of the service station 103 (S2). The information processing apparatus 2 receives the information from the communication terminal 4, and thus acquires the performance degradation information after the rental (S14). In S15, the performance degradation information before the rental and the performance degradation information after the rental are compared with each other, and a degradation degree of the battery 3 is determined. Then, in S16, the treatment for the rental user 102 is decided.

The determination in S15 is made, based on, for example, whether the degradation degree is equal to or greater than a threshold A and whether the degradation degree is equal to or smaller than a threshold B. To be specific, in a case where SOH is adopted as the performance degradation information, it is determined whether a relationship that SOH before rental—SOH after rental≥the threshold A is satisfied. In addition, it is determined whether a relationship that SOH before rental—SOH after rental≤the threshold B is satisfied. The threshold A and the threshold B have a relationship that the threshold A>the threshold B is satisfied. The threshold A is an index for determining whether the degradation degree is worse than usual, and is, for example, 10%. The threshold B is an index for determining whether the degradation degree is lower than usual, and is, for example, 3%.

The decision of the treatment in S16 is made, based on a determination result in S15. For example, a favorable treatment is given to the rental user 102 who has used the battery 3 with less degradation, and an unfavorable treatment is given to the rental user 102 who has used the battery 3 with much degradation.

Specifically, for example, in a case where the relationship that SOH before rental—SOH after rental≥the threshold A is satisfied, it can be determined that the battery 3 has been carelessly used with much degradation (for example, rapid charging and rapid discharging have been repeated). Therefore, additional billing can be imposed on the rental user 102, or an evaluation of the rental user 102 can be reduced. In addition, for example, in a case where the relationship that SOH before rental—SOH after rental≤the threshold B is satisfied, it can be determined that the battery 3 has been used carefully with less degradation. Therefore, the current billing of the rental user 102 can be discounted, a coupon can be issued, or the evaluation of the rental user 102 can be raised. Accordingly, regarding the treatment decision for the rental user 102, the feeling of understanding of the rental user 102 can be improved.

In S17, the information processing apparatus 2 updates the DB 223, based on the information received in S14 and a decision result in S16. For example, the information of "status", "treatment", and "performance degradation" "after rental" in the record of the battery 3 is updated. In S18, a notification is transmitted to the communication terminal 11 of the rental agency 101 and the communication terminal 12 of the rental user 102. The notification includes the battery 3 having been returned and the performance degradation information after the rental. The notification to the communication terminal 12 of the rental user 102 can further include information of the treatment decided in S16.

Second Embodiment

Figure 5:
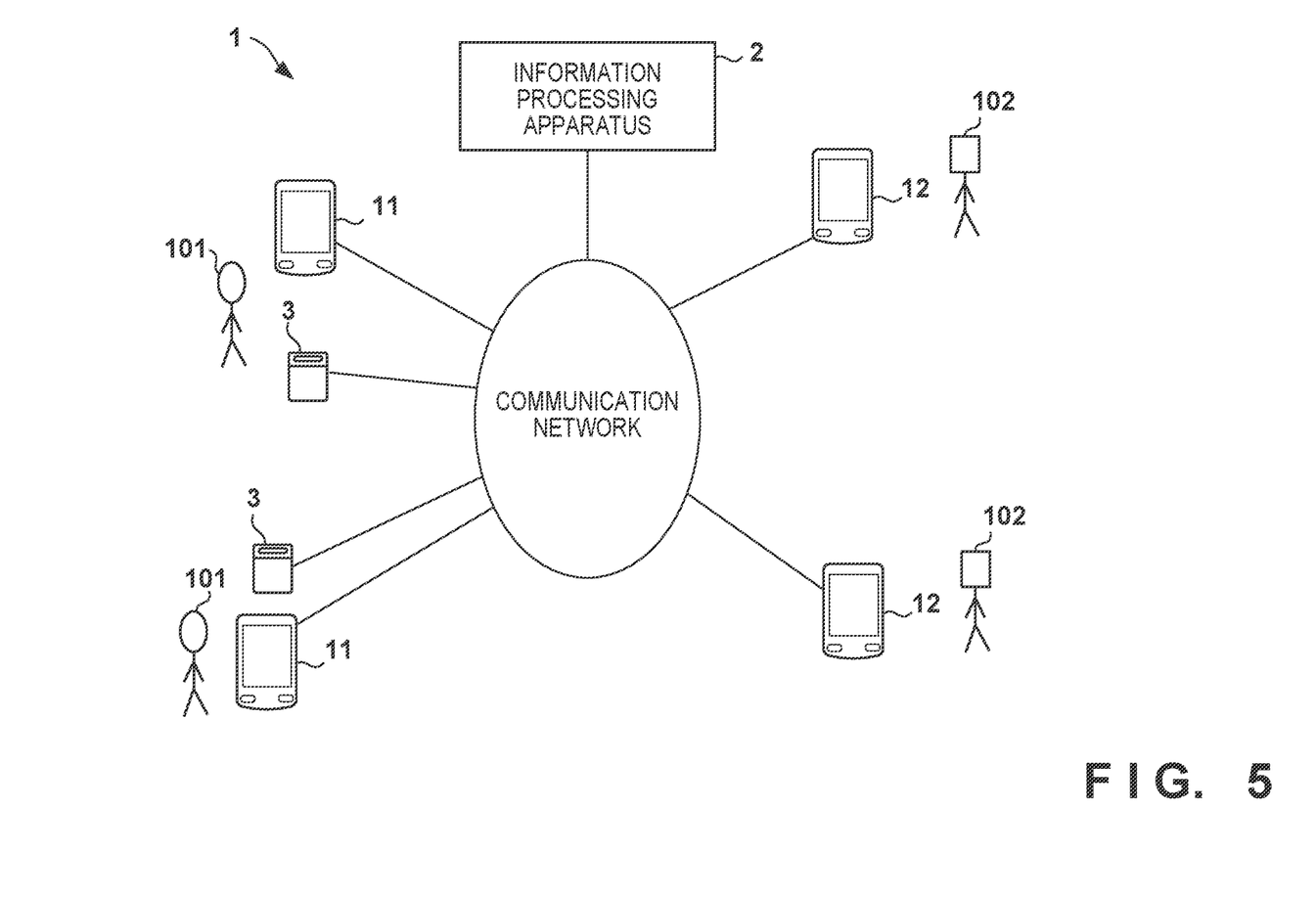
FIG. 5 is a schematic diagram of another assistance system.

In the first embodiment, the information processing apparatus 2 acquires the performance degradation information from the communication terminal 4 of the service station 103. However, the performance degradation information may be acquired from a management device of the battery 3. FIG. 5 is a schematic diagram of the assistance system 1 in the present embodiment. The difference from the first embodiment is that the battery 3 includes the management device, to be described later, capable of communicating with the information processing apparatus 2. In the present embodiment, it is possible to directly deliver and return the battery 3 between the rental agency 101 and the rental user 102 without the intervention of the service station 103.

<Battery>

Figure 6:
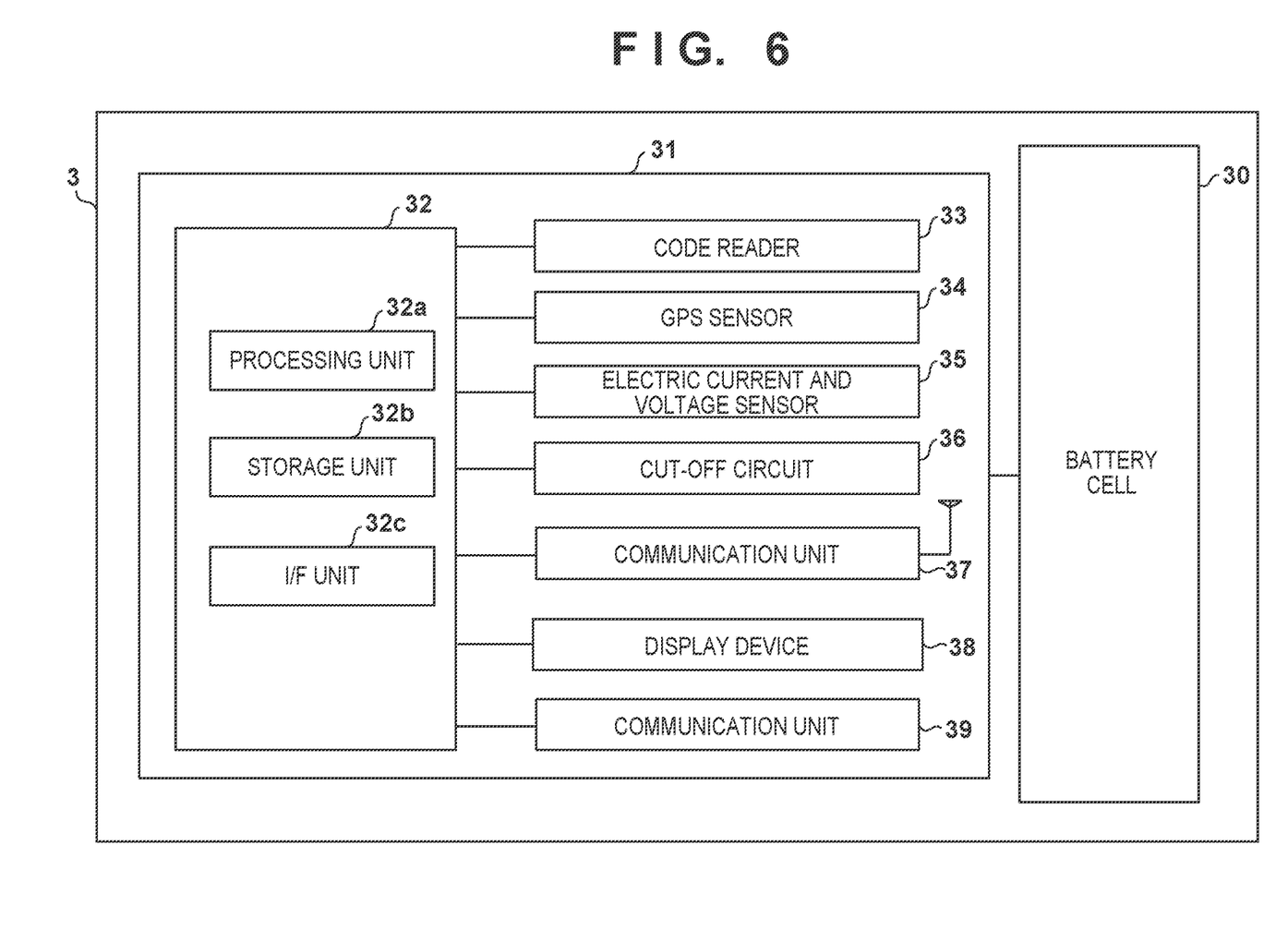
FIG. 6 is an internal block diagram of a battery for use in the assistance system of FIG. 5.

FIG. 6 is a block diagram of the battery 3 in the present embodiment. The battery 3 includes a battery cell 30, which is a power storage device, and a management device 31. The management device 31 includes a control unit 32. The control unit 32 includes a processing unit 32a, a storage unit 32b, and an interface unit (I/F unit) 32c. The processing unit 32a is a processor represented by a CPU, and executes a program stored in the storage unit 32b.

The storage unit 32b is a storage device such as a RAM or a ROM. In the storage unit 32b, various types of information are stored, in addition to the program executed by the processing unit 32a. As various types of information, individual information and performance degradation information of the battery 3 can be included. The I/F unit 32c relays transmission and reception of signals between the processing unit 32a and an external device.

The management device 31 includes a code reader 33. The code reader 33 is, for example, a camera. In the present embodiment, the management device 31 reads a use permission code with the code reader 33, authenticates the use permission code, and then permits charging and discharging of the battery cell 30. The use permission code is, for example, a two-dimensional code, and is transmitted from the information processing apparatus 2 to the communication terminal 12 of the rental user 102. The rental user 102 causes a display unit of the communication terminal 12 to display the use permission code that has been received, and causes the code reader 33 to read the use permission code. The use permission code includes use conditions of the battery 3, in addition to an ID of the usable battery 3. As the use conditions, a period during which the battery 3 can be used, a type of the electric device for which the battery 3 can be used, and the like can be included. The control unit 32 collates these pieces of information included in the use permission code that has been read by the code reader 33 with the information stored in the storage unit 32b, and authenticates the use of the battery 3.

The management device 31 includes a global positioning system (GPS) sensor 34. The GPS sensor 34 is a sensor for detecting a current position of the battery 3. When the usable area of the battery 3 is limited, the management device 31 is capable of checking whether the battery 3 is used in the usable area, based on position information of the GPS sensor 34.

The management device 31 includes an electric current and voltage sensor 35. The electric current and voltage sensor 35 measures a charge or discharge amount of the battery cell 30. Accordingly, the control unit 32 is capable of measuring the performance degradation degree of the battery 3. For example, the control unit 32 measures the performance degradation degree whenever the battery 3 is charged, and stores this as the latest performance degradation information in the storage unit 32b. This performance degradation information is provided for the information processing apparatus 2.

The management device 31 includes a cut-off circuit 36. The cut-off circuit 36 electrically connects or cuts off between an electric device to which the battery 3 is attached and the battery cell 30. For example, in a case where the use permission code is not authenticated, the cut-off circuit 36 is brought into a cut-off state. Accordingly, the electric power supplied from the battery 3 to the electric device is disabled. In addition, in a case where its use violates a use condition included in the use permission code, the cut-off circuit 36 can be brought into the cut-off state. Also in this case, the electric power supplied from the battery 3 to the electric device is disabled.

The management device 31 includes a communication unit 37. The communication unit 37 includes a wireless communication device, and communicates with the information processing apparatus 2 through a communication network. The DB 223 includes information necessary for communicating with the management device 31 of each battery 3. The management device 31 includes a display device 38. The display device 38 is either a light emitting element or a liquid crystal display device, and presents information to the user of the battery 3. The management device 31 includes a communication unit 39. The communication unit 39 establishes a wired connection between the electric device to which the battery 3 is attached and the management device 31. The management device 31 is capable of communicating with the electric device via the communication unit 39, and is capable of acquiring, for example, information of the type of the electric device from the electric device. In a case where there is a restriction on the type of the electric device in light of a rental condition, when the battery 3 is used for an electric device that does not comply with the rental condition, the control unit 32 is also capable of causing the cut-off circuit 36 to be in the cut-off state. Accordingly, the electric power supplied from the battery 3 to the electric device is disabled.

PROCESS EXAMPLE

Figure 7:
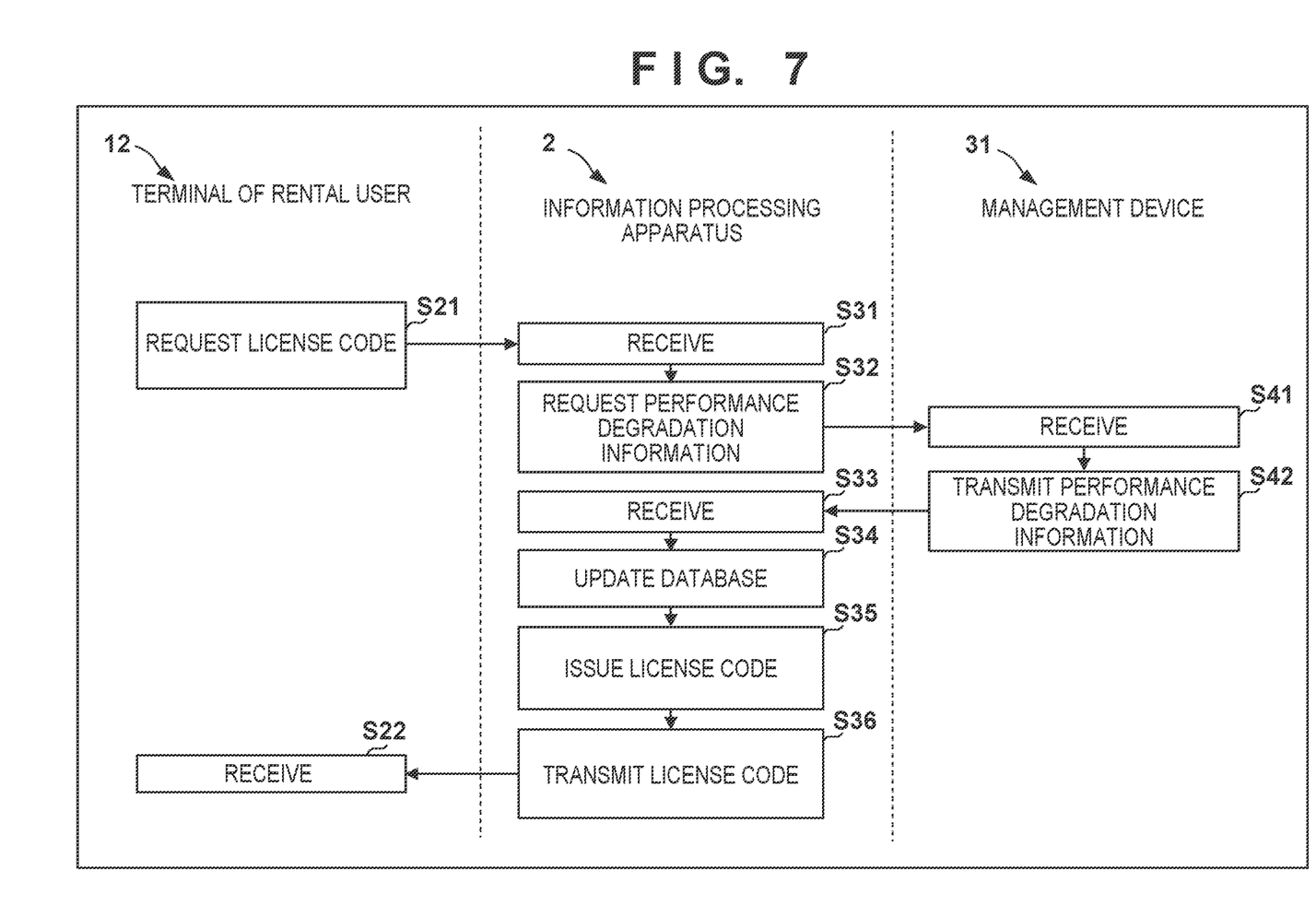
FIG. 7 is a flowchart illustrating an example of a process performed by the assistance system of FIG. 5.

A process example of the system when the battery 3 is rented out and when the battery 3 is returned will be described. FIG. 7 is a flowchart at the time of renting out. When the battery 3 is rented out, the battery 3 is delivered to the rental user 102, and then the rental user 102 requests the information processing apparatus 2 for a use permission code from the communication terminal 12 (S21). Upon receipt of the request (S31), the information processing apparatus 2 requests the management device 31 of the rented battery 3 for the performance degradation information (S32). The management device 31 receives the request (S41), and transmits the latest performance degradation information stored in the storage unit 32b to the information processing apparatus 2 (S42). The information processing apparatus 2 receives the information from the management device 31, and thus acquires the performance degradation information before the rental (S33). In S34, the information processing apparatus 2 updates the DB 223, based on the information received in S33. For example, the "status" and the information of the "performance degradation" "before rental" in the record of the battery 3 are updated.

The information processing apparatus 2 issues the use permission code in S35, and transmits the use permission code to the communication terminal 12 of the rental user 102 in S36. The communication terminal 12 receives the use permission code (S22). The rental user 102 causes the battery 3 to read the use permission code, and starts using the battery 3.

Figure 8:
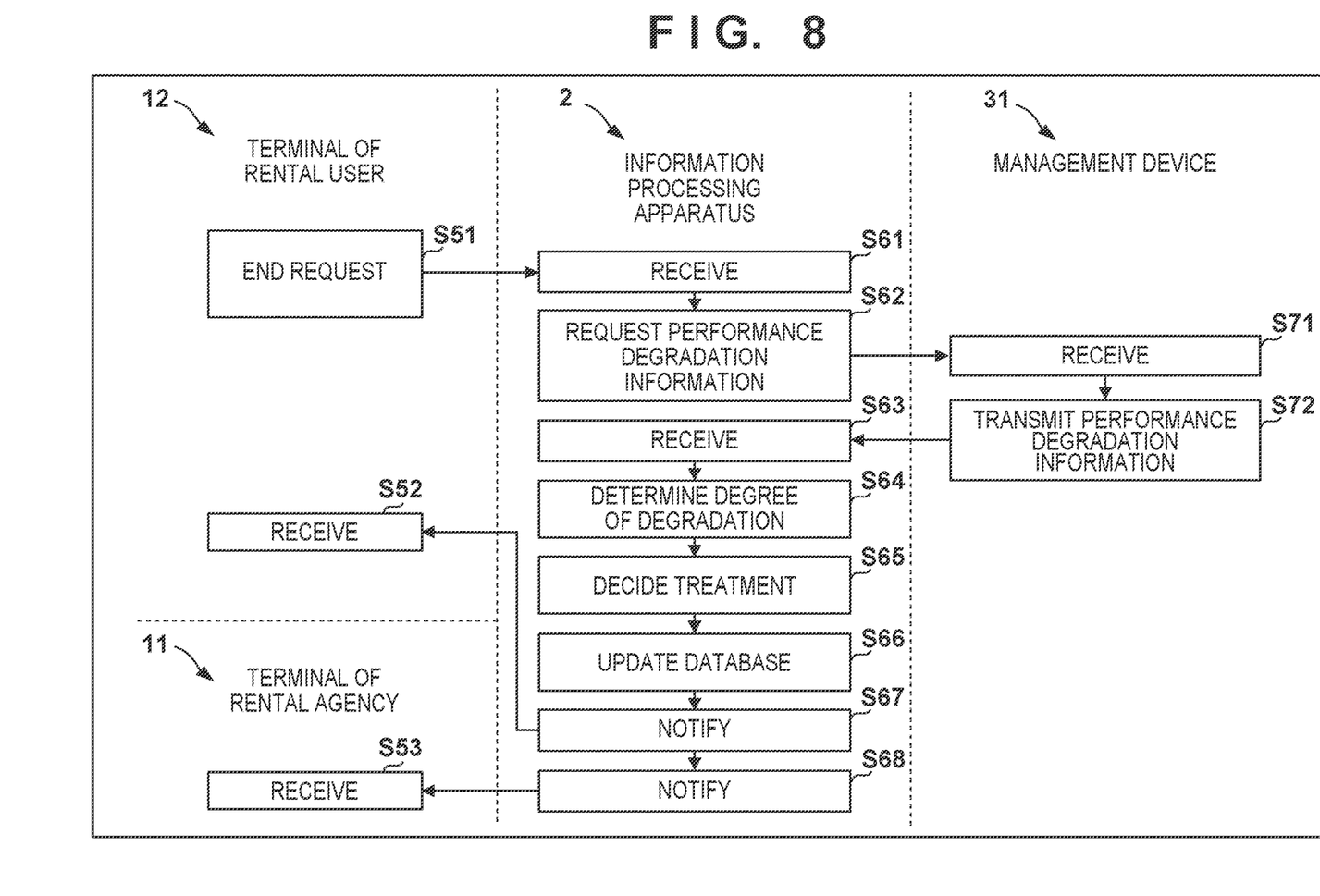
FIG. 8 is a flowchart illustrating an example of the process performed by the assistance system of FIG. 5.

FIG. 8 is a flowchart at the time of return. The rental user 102 transmits an end request from the communication terminal 12 to the information processing apparatus 2 (S51). Upon receipt of the request (S61), the information processing apparatus 2 requests the management device 31 of the rented battery 3 for an end instruction and the performance degradation information (S62). The management device 31 receives the request (S71), sets the cut-off circuit 36 to be in the cut-off state, and transmits the latest performance degradation information stored in the storage unit 32b to the information processing apparatus 2 (S72). The information processing apparatus 2 receives the information from the management device 31, and thus acquires the performance degradation information after the rental (at the time of return) (S63).

In S64, the information processing apparatus 2 compares the performance degradation information before the rental with the performance degradation information after the rental, and determines a degradation degree of the battery 3. Then, in S65, the treatment for the rental user 102 is decided. The processes of S64 and S65 are similar to those in S15 and S16 in the first embodiment. Regarding the treatment decision for the rental user 102, the feeling of understanding of the rental user 102 can be improved.

In S66, the information processing apparatus 2 updates the DB 223, based on the information received in S62 and a decision result in S65. For example, the information of "status", "treatment", and "performance degradation" "after rental" in the record of the battery 3 is updated.

In S67, the information processing apparatus 2 transmits a notification to the communication terminal 12 of the rental user 102. The notification includes, for example, the acceptance of an end request of the battery 3, the battery 3 being to be returned to the rental agency 101, the performance degradation information after the rental, and information of the treatment. In S68, the information processing apparatus 2 transmits a notification to the communication terminal 11 of the rental agency 101. The notification includes, for example, the rental of the battery 3 having been ended and the battery 3 is to be returned to the rental agency 101, and the performance degradation information after the rental.

Process Example During Rental

Figure 9:
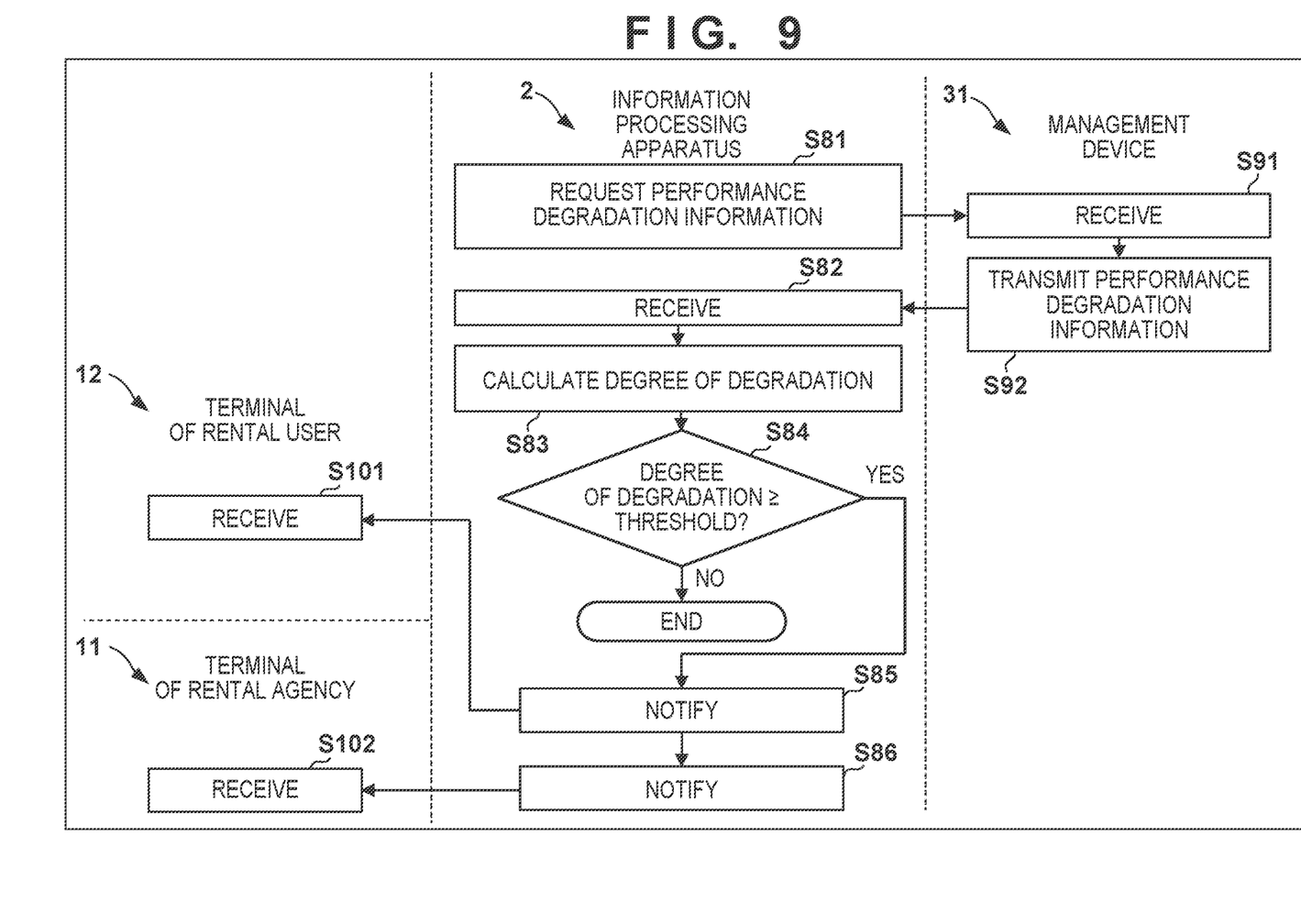
FIG. 9 is a flowchart illustrating an example of the process performed by the assistance system of FIG. 5.

A process example while the battery 3 is being rented will be described with reference to FIG. 9. The rental agency 101 has an interest in use situations of the rental user 102 while the battery 3 is being rented, because the value of the battery 3 is degraded in a case where the battery 3 is not appropriately used. In addition, in some cases, the rental user 102 uses the battery 3 inappropriately without realizing it. Therefore, calling attention to this will lead to improvement. The information processing apparatus 2 monitors whether the battery 3 is being appropriately used. The process of FIG. 9 can be performed, for example, periodically (every ⅓ to ¼ of the rental period).

In S81, the information processing apparatus 2 requests the management device 31 of the battery 3 for the performance degradation information. The management device 31 receives the request (S91), and transmits the latest performance degradation information stored in the storage unit 32b to the information processing apparatus 2 (S92). The information processing apparatus 2 receives the information from the management device 31, and thus acquires the performance degradation information after the rental (an intermediate stage) (S82). In step S83, the information processing apparatus 2 compares the performance degradation information before the rental with the performance degradation information at an intermediate stage, and calculates a degradation degree of the battery 3.

Then, in S84, it is determined whether the degradation degree calculated in S83 is equal to or larger than a threshold C. The purpose of the determination here is whether there is a high possibility that the rental user 102 will receive an unfavorable treatment at the time of return, in a case where the battery continues to be used in the same way. Therefore, the threshold C is set to a value smaller than the threshold A described above. For example, the threshold C is set within a range from 0.6×the threshold A to 0.8×the threshold A. In a case where the degradation degree calculated in S83 is smaller than the threshold C, the process ends, and in a case where the degradation degree is equal to or larger than the threshold C, the process proceeds to S85.

Alternatively, the degradation degree calculated in S83 is stored in the storage unit 32*b*, and in addition, the degradation degree calculated in S83 is compared with the previously stored degradation degree in S84, when the performance degradation information is requested next time, and it is determined whether its difference is equal to or larger than a threshold D. The purpose of the determination here is to ascertain a change in the degradation degree within a certain period, and thus to ascertain whether there is a high possibility that the rental user 102 will receive an unfavorable treatment at the time of return, in the case where the way in which the battery is used remains the same.

In S85, the information processing apparatus 2 transmits a notification to the communication terminal 12 of the rental user 102, and the communication terminal 12 receives such a notification (S101). The notification is, for example, a notification encouraging careful use, because the battery 3 is degrading rapidly. Upon receipt of this notification, the rental user 102 is able to review the way in which the battery 3 is used.

In S86, the information processing apparatus 2 transmits a notification to the communication terminal 11 of the rental agency 101, and the communication terminal 11 receives such a notification (S102). The notification is, for example, a notification for informing that the rental user 102 is using the battery 3 in a way of developing the degradation of the battery 3 fast. Upon receipt of this notification, the rental agency 101 is able to know actual conditions regarding the usage of the battery 3. The rental agency 101 is able to warn the rental user 102 or to consider measures such as stopping the rental.

Figure 10:
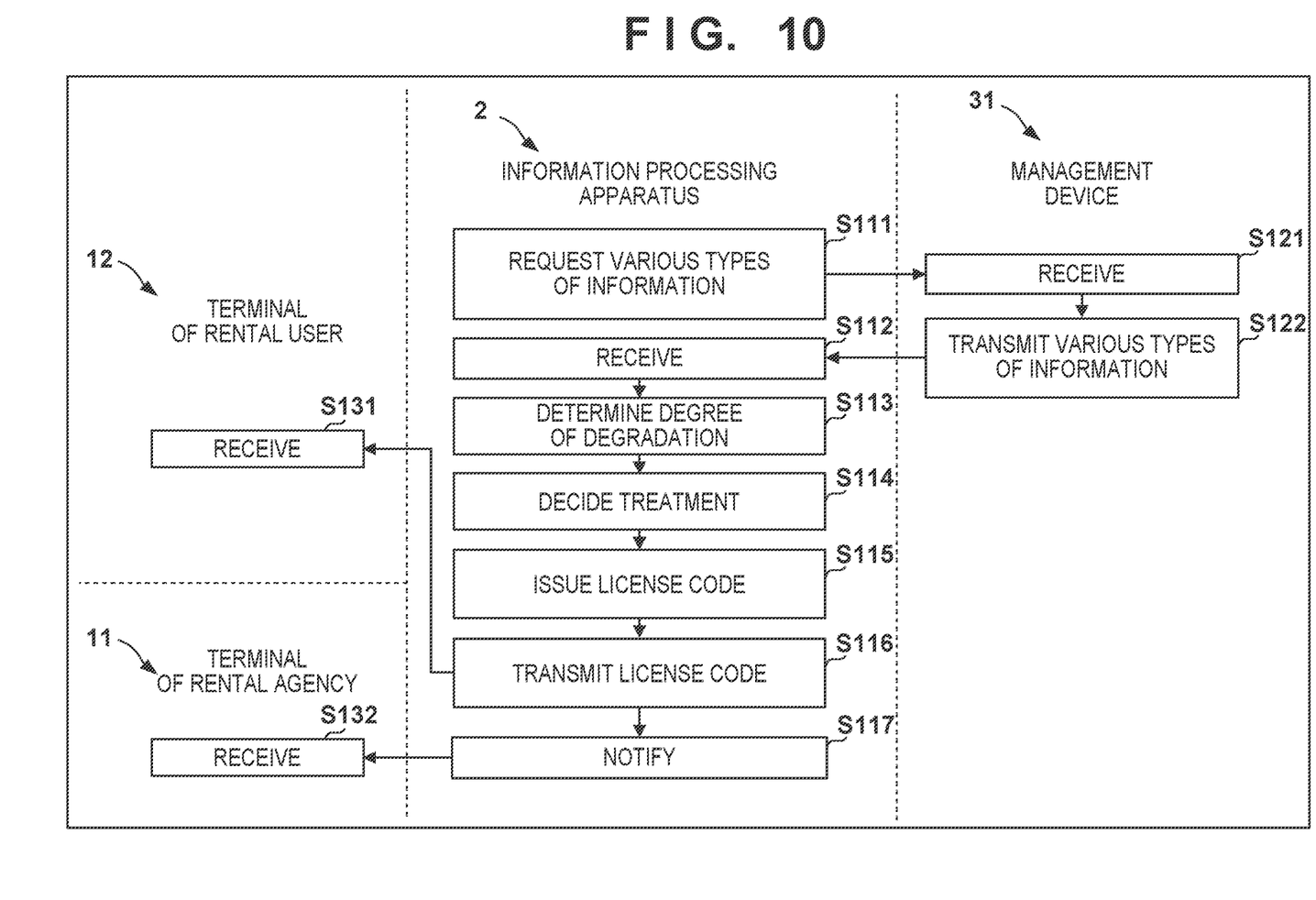
FIG. 10 is a flowchart illustrating an example of the process performed by the assistance system of FIG. 5.

Next, another process example during rental will be described with reference to FIG. 10. Also in the example of FIG. 10, the information processing apparatus 2 monitors whether the battery 3 is appropriately used while the battery 3 is being rented. During the rental period, the use permission code is updated and issued several times. Each use permission code is a code with a time limit shorter than the rental period. When the use permission code is issued, the treatment for the rental user 102 about the use of the battery 3 is reviewed so as to encourage the rental user 102 to appropriately use the battery 3. In addition, the value of the battery 3 can be maintained, and the feeling of understanding of the rental agency 101 can be improved. Further, in a case where the battery 3 is stolen, its use can be suppressed. The process of FIG. 10 can be performed at an update timing of the use permission code.

In S111, the information processing apparatus 2 requests the management device 31 of the battery 3 for various types of information. The various types of information include at least the performance degradation information, and can include information of a use environment of the battery 3. As the information of the use environment, information of the type of electric device for which the battery 3 is used, information of a geographical area in which the battery 3 is used, and an environment to which the battery 3 is exposed (information of vibration, temperature, humidity, and the like) can be included. At least some pieces of the information of the use environment may be information that has been acquired via the communication unit 39 by the management device 31 from the electric device to which the battery 3 is attached.

The management device 31 receives the request (S121), and transmits various types of information including the latest performance degradation information stored in the storage unit 32*b* to the information processing apparatus 2 (S122). By receiving the information from the management device 31, the information processing apparatus 2 acquires the various types of information including the performance degradation information after the rental (an intermediate stage) (S112). The information processing apparatus 2 compares the performance degradation information before the rental with the performance degradation information at an intermediate stage in S113 to determine a degradation degree of the battery 3, and decides a treatment for the rental user 102 in S114.

The treatment here relates to the use conditions of the battery 3 thereafter. For example, in a case where the degradation degree of the battery 3 is equal to or larger than a threshold, or in a case where an environment value such as the vibration, temperature, humidity, or the like is equal to or larger than a threshold, a use restriction of the battery 3 can be imposed.

For example, a restriction on the geographical area and a restriction on the type of the electric device to be attached to can be included. Regarding the restriction on the geographical area, for example, the use area of the battery 3 is restricted to an area within a certain range from the address of the rental agency 101. Accordingly, the rental agency 101 is able to visit the use area of the battery 3, and to directly monitor the use state of the battery 3 of the rental user 102. Regarding the restriction on the type of the electric device, for example, the use of the battery 3 is restricted to an electric device having a small rated output, or the use of the battery 3 is restricted to an electric device having small vibrations.

On the other hand, in a case where the degradation degree of the battery 3 is smaller than the threshold, or in a case where the environment value such as the vibration, temperature, or humidity is smaller than the threshold, the use conditions of the battery 3 are not changed.

In S115, the information processing apparatus 2 issues a use permission code including the content of the treatment decided in S114, and transmits the use permission code to the communication terminal 12 of the rental user 102 in S116. In a case where the treatment is changed in S114, a notification of such a change is also transmitted. The communication terminal 12 receives the use permission code (S131). The rental user 102 causes the battery 3 to read the use permission code, and is able to continue using the battery 3. Regarding an old use permission code, when it expires, it is impossible to use the battery 3, even if the battery 3 is caused to read the old use permission code.

In a case where the treatment is changed by the decision in S114 and there is a restriction on the use conditions, the management device 31 controls the battery 3 in accordance with new use conditions. For example, in a case where a restriction is given to a geographical area, the control unit 32 identifies a use area of the battery 3, based on the current position information that has been detected by the GPS sensor 34, and sets the cut-off circuit 36 to be in the cut-off state, in a case where a use condition is violated. In addition, for example, in a case where there is a restriction on the type of the electric device, the control unit 32 acquires information of the type of the electric device from the electric device to which the battery 3 is attached via the communication unit 39, and sets the cut-off circuit 36 to be in the cut-off state, in a case where a use condition is violated.

In S117, the information processing apparatus 2 transmits a notification to the communication terminal 11 of the rental agency 101, and the communication terminal 11 receives such a notification (S132). The notification includes, for example, an intermediate report on the use situations of the battery 3. The intermediate report can include the degradation degree of the battery 3 determined in S113 and the information of the use environment received in S112. In addition, the intermediate report can also include the content of the treatment decided in S114. The rental agency 101 is able to call attention to the rental user 102 or to consider measures such as the stop of the rental.

SUMMARY OF EMBODIMENTS

The above embodiments disclose at least the following information processing apparatus and information processing method.

1. The information processing (2) apparatus of the embodiment is an information processing apparatus (2) that processes information related to a rental of a battery (3), comprising:
a first acquisition unit (S11) configured to acquire performance degradation information before the rental of the battery;
a second acquisition unit (S14) configured to acquire performance degradation information after the rental of the battery; and
a decision unit (S16) configured to decide a treatment for a rental user of the battery, based on the performance degradation information that is acquired by the first acquisition unit and the performance degradation information that is acquired by the second acquisition unit.

According to the present embodiment, the performance degradation information before and after the battery is rented out is considered in the treatment decision for the rental user, the feeling of understanding of the rental user can be improved. That is, the treatment is given to the rental user based on a difference in value of the battery that has been actually changed by the use of the rental user, so that the user's feeling of understanding of the treatment can be further improved.

2. In the embodiment, the decision unit decides an unfavorable treatment for the rental user, in a case where the performance degradation information after the rental indicates degradation equal to or larger than a predetermined degree with respect to the performance degradation information before the rental.

According to this embodiment, the value of the battery can be prevented from being greatly impaired. The rental agency is capable of expecting collection of proper profit and maintenance of the value of the battery.

3. In the embodiment, a notification unit (S86) configured to notify a terminal of the rental user of the battery, in a case where the performance degradation information after the rental indicates degradation equal to or larger than a predetermined degree with respect to the performance degradation information before the rental is provided.

According to this embodiment, the user can be given an opportunity to review a way in which the battery is used that degrades the value of the battery.

4. In the embodiment, a notification unit (S86) configured to notify a terminal of a rental agency of the battery, in a case where the performance degradation information after the rental indicates degradation equal to or larger than a predetermined degree with respect to the performance degradation information before the rental is provided.

According to this embodiment, the rental agency is able to get to know the use that degrades the value of the battery. The rental agency may take measures such as the stop of the rental as necessary.

5. In the embodiment, the second acquisition unit acquires the performance degradation information by receiving information transmitted from a management device (31) provided in the battery.

According to this embodiment, a decision is made, based on the information transmitted from the battery, so that more reliable information can be obtained.

6. In the embodiment, the unfavorable treatment is a use restriction of the battery.

According to this embodiment, in a case where an unintended use of the rental agency occurs, such an unintended use can be handled promptly.

7. In the embodiment, the information transmitted from the management device (31) includes information of a use environment of the battery.

According to this embodiment, the possibility of degrading the value of the battery can be easily determined.

8. In the embodiment, the decision unit decides a favorable treatment for the rental user, in a case where the performance degradation information when the rental ends indicates degradation equal to or smaller than a predetermined degree with respect to the performance degradation information before the rental.

According to this embodiment, careful use of the battery by the rental user is promoted.

9. In the embodiment, a transmission unit configured to transmit a use permission code to a terminal of the rental user of the battery is provided, and the battery is chargeable and dischargeable on condition that the use permission code is read by a management device (31) provided in the battery.

According to this embodiment, use control of the battery is facilitated.

10. In the embodiment, the use permission code includes information related to a use condition of the battery.

According to this embodiment, a restriction can be imposed on the use of the battery that is not intended by the rental agency.

11. In the embodiment, the use permission code is updated a plurality of times within a rental period of the battery.

According to this embodiment, a restriction can be imposed on the use of the battery that is not intended by the rental agency. In addition, measures against theft of the battery can be taken.

12. The information processing method of the embodiment is an information processing method for processing information related to a rental of a battery (3), comprising:

a first acquisition step (S11), by an information processing apparatus (2), of acquiring performance degradation information before the rental of the battery;

a second acquisition step (S14), by the information processing apparatus (2), of acquiring performance degradation information after the rental of the battery; and a decision step (S16), by the information processing apparatus (2), of deciding a treatment for a rental user of the battery, based on the performance degradation information that is acquired by the first acquisition step and the performance degradation information that is acquired by the second acquisition step.

According to the present embodiment, the performance degradation information before and after the battery is rented out is considered in the treatment decision for the rental user, the feeling of understanding of the rental user can be improved. That is, the treatment is given to the rental user based on a difference in value of the battery that has been actually changed by the use of the rental user, so that the feeling of understanding about the treatment can be further improved.

While an embodiment has been describe, the invention is not limited to the foregoing embodiments, and various variations/changes are possible within the spirit of the invention.

What is claimed is:

1. An information processing apparatus that processes information related to a rental of a battery, comprising:
    a first acquisition unit configured to acquire first performance degradation information before the rental of the battery;
    a second acquisition unit configured to acquire second performance degradation information after the rental of the battery; and
    a decision unit configured to decide a treatment for a rental user of the battery, based on the first performance degradation information that is acquired by the first acquisition unit and the second performance degradation information that is acquired by the second acquisition unit,
    wherein the decision unit decides an unfavorable treatment for the rental user, in a case where the second performance degradation information after the rental indicates degradation equal to or larger than a predetermined degree with respect to the first performance degradation information before the rental.

2. The information processing apparatus according to claim 1, further comprising a notification unit configured to notify a terminal of the rental user of the battery, in a case where the second performance degradation information after the rental indicates degradation equal to or larger than a predetermined degree with respect to the first performance degradation information before the rental.

3. The information processing apparatus according to claim 1, further comprising a notification unit configured to notify a terminal of a rental agency of the battery, in a case where the second performance degradation information after the rental indicates degradation equal to or larger than a predetermined degree with respect to the first performance degradation information before the rental.

4. The information processing apparatus according to claim 1, wherein the second acquisition unit acquires the second performance degradation information by receiving information transmitted from a management device provided in the battery.

5. The information processing apparatus according to claim 1, wherein the unfavorable treatment is a use restriction of the battery.

6. The information processing apparatus according to claim 4, wherein the information transmitted from the management device includes information of a use environment of the battery.

7. The information processing apparatus according to claim 1, wherein the decision unit decides a favorable treatment for the rental user, in a case where the second performance degradation information after the rental indicates degradation equal to or smaller than a predetermined degree with respect to the first performance degradation information before the rental.

8. The information processing apparatus according to claim 1, further comprising
    a transmission unit configured to transmitting a use permission code to a terminal of the rental user of the battery, wherein
    the battery is chargeable and dischargeable on condition that the use permission code is read by a management device provided in the battery.

9. The information processing apparatus according to claim 8, wherein the use permission code includes information related to a use condition of the battery.

10. The information processing apparatus according to claim 8, wherein the use permission code is updated a plurality of times within a rental period of the battery.

11. An information processing method for processing information related to a rental of a battery, comprising:
    a first acquisition step, by an information processing apparatus, of acquiring first performance degradation information before the rental of the battery;
    a second acquisition step, by the information processing apparatus, of acquiring second performance degradation information after the rental of the battery; and
    a decision step, by the information processing apparatus, of deciding a treatment for a rental user of the battery, based on the first performance degradation information that is acquired by the first acquisition step and the second performance degradation information that is acquired by the second acquisition step,
    wherein in the decision step, an unfavorable treatment for the rental user is decided in a case where the second performance degradation information after the rental indicates degradation equal to or larger than a predetermined degree with respect to the first performance degradation information before the rental.

12. An information processing apparatus that processes information related to a rental of a battery, comprising:
    a first acquisition unit configured to acquire first performance degradation information before the rental of the battery;
    a second acquisition unit configured to acquire second performance degradation information after the rental of the battery;
    a decision unit configured to decide a treatment for a rental user of the battery, based on the first performance degradation information that is acquired by the first acquisition unit and the second performance degradation information that is acquired by the second acquisition unit, and
    a transmission unit configured to transmitting a use permission code to a terminal of the rental user of the battery, wherein the battery is chargeable and dischargeable on condition that the use permission code is read by a management device provided in the battery.

13. An information processing method for processing information related to a rental of a battery, comprising:
   a first acquisition step, by an information processing apparatus, of acquiring first performance degradation information before the rental of the battery;
   a second acquisition step, by the information processing apparatus, of acquiring second performance degradation information after the rental of the battery;
   a decision step, by the information processing apparatus, of deciding a treatment for a rental user of the battery, based on the first performance degradation information that is acquired by the first acquisition step and the second performance degradation information that is acquired by the second acquisition step; and
   a transmission step, by the information processing apparatus, of transmitting a use permission code to a terminal of the rental user of the battery,
   wherein the battery is chargeable and dischargeable on condition that the use permission code is read by a management device provided in the battery.

14. A non-transitory computer-readable storage medium storing a program configured to cause a computer to execute an information processing method for processing information related to a rental of a battery, the method comprising:
   a first acquisition step, by an information processing apparatus, of acquiring first performance degradation information before the rental of the battery;
   a second acquisition step, by the information processing apparatus, of acquiring second performance degradation information after the rental of the battery; and
   a decision step, by the information processing apparatus, of deciding a treatment for a rental user of the battery, based on the first performance degradation information that is acquired by the first acquisition step and the second performance degradation information that is acquired by the second acquisition step,
   wherein in the decision step, an unfavorable treatment for the rental user is decided in a case where the second performance degradation information after the rental indicates degradation equal to or larger than a predetermined degree with respect to the first performance degradation information before the rental.

15. A non-transitory computer-readable storage medium storing a program configured to cause a computer to execute an information processing method for processing information related to a rental of a battery, the method comprising:
   a first acquisition step of acquiring first performance degradation information before the rental of the battery;
   a second acquisition step of acquiring second performance degradation information after the rental of the battery;
   a decision step of deciding a treatment for a rental user of the battery, based on the first performance degradation information that is acquired by the first acquisition step and the second performance degradation information that is acquired by the second acquisition step; and
   a transmission step of transmitting a use permission code to a terminal of the rental user of the battery,
   wherein the battery is chargeable and dischargeable on condition that the use permission code is read by a management device provided in the battery.

* * * * *